United States Patent
Dai et al.

(10) Patent No.: US 11,190,613 B2
(45) Date of Patent: *Nov. 30, 2021

(54) METHOD, DEVICE, AND COMPUTER STORAGE MEDIUM FOR RADIO CONNECTION

(71) Applicant: GUANGDONG OPPO MOBILE TELECOMMUNICATIONS CORP., LTD., Guangdong (CN)

(72) Inventors: Bo Dai, Guangdong (CN); Feng Xie, Guangdong (CN); Yada Huang, Guangdong (CN); Yu Ngok Li, Guangdong (CN); Guanghui Yu, Guangdong (CN); Liujun Hu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,581

(22) Filed: Jul. 24, 2019

(65) Prior Publication Data
US 2019/0349448 A1 Nov. 14, 2019

Related U.S. Application Data

(63) Continuation of application No. 15/029,912, filed as application No. PCT/CN2014/077695 on May 16, 2014, now Pat. No. 10,389,843.

(30) Foreign Application Priority Data

Oct. 16, 2013 (CN) .......................... 201310486110.9

(51) Int. Cl.
*H04W 36/00* (2009.01)
*H04L 29/08* (2006.01)
(Continued)

(52) U.S. Cl.
CPC ........... *H04L 67/303* (2013.01); *H04W 16/32* (2013.01); *H04W 24/02* (2013.01); *H04W 36/10* (2013.01);
(Continued)

(58) Field of Classification Search
CPC ..... H04W 36/30; H04W 36/04; H04W 48/16; H04W 76/025; H04W 36/12;
(Continued)

(56) References Cited

U.S. PATENT DOCUMENTS 6,526,131 B1  2/2003 Zimmerman et al.
7,263,076 B1  8/2007 Leibovitz et al.
(Continued)

FOREIGN PATENT DOCUMENTS

CN  1398478 A  2/2003
CN  101001469 A  7/2007
(Continued)

OTHER PUBLICATIONS

Broadcom Corporation, "Some feasible scenarios for small cells with dual connectivity," 3GPP TSG-RAN WG2 Meeting #81, St. Julian's, Malta, R2-130563, 4 pages, Jan. 2013.
(Continued)

*Primary Examiner* — Danh C Le
(74) *Attorney, Agent, or Firm* — Perkins Coie LLP

(57) ABSTRACT

A method, device and a computer storage medium for wireless connection are provided. The method includes that: a main Transmission Point (TP) sends a connection indication to User Equipment (UE), the connection indication being used to indicate the UE to establish a connection with at least one sub TP on the premise of keeping a current connection with the main TP.

12 Claims, 3 Drawing Sheets

(51) Int. Cl.
*H04W 76/34* (2018.01)
*H04W 76/15* (2018.01)
*H04W 16/32* (2009.01)
*H04W 24/02* (2009.01)
*H04W 36/10* (2009.01)
*H04W 36/38* (2009.01)
*H04W 76/30* (2018.01)

(52) U.S. Cl.
CPC ........... *H04W 36/38* (2013.01); *H04W 76/15* (2018.02); *H04W 76/34* (2018.02); *H04W 76/30* (2018.02)

(58) Field of Classification Search
CPC ....... H04W 36/08; H04W 6/16; H04W 92/02; H04W 76/02; H04W 16/32; H04W 84/045; H04W 36/0011
USPC ............. 455/438, 444, 445, 550, 1; 370/331
See application file for complete search history.

(56) References Cited

U.S. PATENT DOCUMENTS

| | | | |
|---|---|---|---|
| 7,634,269 | B2 | 12/2009 | Gallagher |
| 7,899,495 | B2 | 3/2011 | Laroia et al. |
| 8,635,462 | B2 | 1/2014 | Ullmann |
| 9,042,346 | B2* | 5/2015 | Kim .................. H04W 36/0005 370/331 |
| 9,392,522 | B2 | 7/2016 | Stojanovski et al. |
| 9,432,209 | B2 | 8/2016 | Wendt |
| 2008/0014991 | A1 | 1/2008 | Laroia et al. |
| 2010/0099407 | A1 | 4/2010 | Qiu |
| 2011/0122821 | A1 | 5/2011 | Laroia et al. |
| 2011/0217947 | A1 | 9/2011 | Czaja et al. |
| 2011/0286343 | A1 | 11/2011 | Powell et al. |
| 2012/0062369 | A1 | 3/2012 | Ishizaki et al. |
| 2012/0099462 | A1* | 4/2012 | Yuda .................... H04L 5/0073 370/252 |
| 2012/0140689 | A1 | 6/2012 | Pelletier et al. |
| 2012/0300662 | A1 | 11/2012 | Wang et al. |
| 2012/0306650 | A1* | 12/2012 | Taniguchi ................ G07G 1/01 340/540 |
| 2013/0016696 | A1 | 1/2013 | Adjakple et al. |
| 2013/0102305 | A1 | 4/2013 | Liu et al. |
| 2013/0208649 | A1* | 8/2013 | Waldhauser ...... H04W 36/0055 370/315 |
| 2014/0018031 | A1* | 1/2014 | Ode ........................ H04W 4/90 455/404.1 |
| 2014/0045494 | A1 | 2/2014 | Pekonen et al. |
| 2014/0071907 | A1 | 3/2014 | Roeland et al. |
| 2014/0160950 | A1 | 6/2014 | Vasudevan et al. |
| 2014/0187246 | A1* | 7/2014 | Jha .......................... H04L 5/001 455/436 |
| 2014/0198708 | A1* | 7/2014 | Lee ...................... H04W 76/14 370/312 |
| 2014/0204847 | A1* | 7/2014 | Belleschi .............. H04W 76/14 370/329 |
| 2014/0219248 | A1 | 8/2014 | Reddiboyana et al. |
| 2014/0233449 | A1 | 8/2014 | Laroia et al. |
| 2014/0241281 | A1 | 8/2014 | Wu |
| 2014/0243038 | A1* | 8/2014 | Schmidt ................ H04W 76/14 455/552.1 |
| 2014/0301200 | A1 | 10/2014 | Miura et al. |
| 2014/0328182 | A1 | 11/2014 | Gao et al. |
| 2014/0349579 | A1* | 11/2014 | Zhou .................. H04L 63/0892 455/41.2 |
| 2014/0355562 | A1 | 12/2014 | Gao et al. |
| 2015/0003308 | A1* | 1/2015 | Jin ...................... H04W 68/005 370/310 |
| 2015/0004901 | A1* | 1/2015 | Agiwal ................ H04W 76/14 455/39 |
| 2015/0031372 | A1 | 1/2015 | Foerster et al. |
| 2015/0031732 | A1 | 1/2015 | Kaushik et al. |
| 2015/0045038 | A1 | 2/2015 | Gao et al. |
| 2015/0067351 | A1* | 3/2015 | Wang ................ H04W 12/1206 713/189 |
| 2015/0181493 | A1* | 6/2015 | Park ...................... H04W 36/08 455/436 |
| 2015/0245394 | A1* | 8/2015 | Sharma ................ H04W 36/03 455/434 |
| 2015/0295883 | A1* | 10/2015 | Suram ................ H04L 63/0209 726/15 |
| 2015/0365984 | A1 | 12/2015 | Lee et al. |
| 2015/0373719 | A1* | 12/2015 | Xu ........................ H04W 72/04 370/329 |
| 2015/0382157 | A1* | 12/2015 | Xu ........................ H04W 76/40 370/312 |
| 2016/0112164 | A1 | 4/2016 | Worrall |
| 2016/0205681 | A1 | 7/2016 | Kim et al. |
| 2016/0234874 | A1* | 8/2016 | Jung ...................... H04W 76/23 |
| 2016/0242092 | A1 | 8/2016 | Rosa et al. |
| 2016/0249390 | A1 | 8/2016 | Hans et al. |
| 2016/0374139 | A1* | 12/2016 | Chen ...................... H04W 24/02 |

FOREIGN PATENT DOCUMENTS

| | | |
|---|---|---|
| CN | 101378360 A | 3/2009 |
| CN | 101502019 A | 8/2009 |
| CN | 101803449 A | 8/2010 |
| CN | 102405682 A | 4/2012 |
| CN | 102685796 A | 9/2012 |
| CN | 103155687 A | 6/2013 |
| WO | 2008/008964 A2 | 1/2008 |
| WO | 2013/010005 A1 | 1/2013 |

OTHER PUBLICATIONS

International Search Report and Written Opinion dated Jul. 29, 2014 for International Application No. PCT/CN2014/077695, filed on May 16, 2014 (29 pages).
Supplementary European Search Report dated Sep. 21, 2016 for European Application No. 14795069.5, filed on May 16, 2014 (7 pages).
First Office Action of the U.S. Appl. No. 15/029,912, dated Feb. 23, 2017.
Final Office Action of the U.S. Appl. No. 15/029,912, dated Aug. 11, 2017.
Advisory Action of the U.S. Appl. No. 15/029,912, dated Oct. 27, 2017.
First Office Action after First RCE of the U.S. Appl. No. 15/029,912, dated Dec. 8, 2017.
Final Office Action after First RCE of the U.S. Appl. No. 15/029,912, dated Apr. 25, 2018.
Advisory Action after First RCE of the U.S. Appl. No. 15/029,912, dated Jun. 29, 2018.
First Office Action after Second RCE of the U.S. Appl. No. 15/029,912, dated Aug. 14, 2018.
Final Office Action after Second RCE of the U.S. Appl. No. 15/029,912, dated Jan. 24, 2019.
First Office Action of the Chinese application No. 201310486110.9, dated Sep. 29, 2018.
Second Office Action of the Chinese application No. 201310486110.9, dated Jan. 2, 2019.
Supplementary European Search Report in the European application No. 19157892.1, dated Aug. 21, 2019.
Supplementary European Search Report in the European application No. 19157893.9, dated Aug. 21, 2019.
3GPP TS 38.331 V16.4.1 (Mar. 2021), 3rd Generation Partnership Project; Technical Specification Group Radio Access Network; NR; Radio Resource Control (RRC) protocol specification (Release 16).
3GPP TS 38.300 V16.5.0 (Mar. 2021), 3rd Generation Partnership Project; Technical Specification Group Radio Access Network; NR; NR and NG-RAN Overall Description; Stage 2 (Release 16).

* cited by examiner

METHOD, DEVICE, AND COMPUTER STORAGE MEDIUM FOR RADIO CONNECTION

CROSS REFERENCE TO RELATED APPLICATIONS

This patent document is a continuation of and claims priority to U.S. patent application Ser. No. 15/029,912, filed on Apr. 15, 2016, which is a national stage application under 35 U.S.C. 371 of International Patent Application No. PCT/CN2014/077695, filed on May 16, 2014, which claims the benefit of priority of Chinese Patent Application No. 201310486110.9, filed on Oct. 16, 2013. The entire contents of the before-mentioned patent applications are incorporated by reference as part of the disclosure of this application.

TECHNICAL FIELD

The disclosure relates to a mobile wireless communication technology, and in particular to a method, device and a computer storage medium for wireless connection.

BACKGROUND

In a wireless cellular communication system, an Evolved Node B (eNB) or Base Station (BS) is a device providing wireless access for User Equipment (UE) which may also be called a terminal, and the eNB or BS performs wireless communication with the UE through an electromagnetic wave. One eNB or BS may provide one or more serving cells, and a wireless communication system may provide wireless coverage for terminals within a certain geographical range through the serving cells.

In order to provide wireless communication for users in a large range, a wireless communication system is required to deploy an eNB or BS with a large coverage area, such an eNB or BS is usually called a macro eNB or macro BS, and its serving cell is usually called a macro cell. In addition, in consideration of different requirements of users and different application environments, the wireless communication system is required to provide users with wireless communication service for compensating coverage holes or provide users with wireless communication service having higher quality, so that some small eNBs or BSs with narrow coverage ranges and lower transmitted power are adopted. These small eNBs or BSs include pico eNBs or pico BSs and femto eNBs or femto BSs, wherein the femto eNBs or femto BSs may also be called Home NBs (HNBs) or Home eNBs (HeNBs), cells provided by the pico eNBs or pico BSs are called pico cells, and cells provided by the femto eNBs or femto BSs are called femto cells. Nodes corresponding to small eNBs or BSs are also called Low Power Nodes (LPNs), and cells corresponding to these LPNs are also called small cells. The macro eNBs or BSs, the small eNBs or BSs, the pico eNBs or BSs and the femto eNBs or femto BSs may also be collectively referred to as Transmission Points (TPs).

When an ideal backhaul link connection is adopted between a macro eNB or BS and a pico eNB or BS, or between a pico eNB or BS and a pico eNB or BS or between a macro eNB or BS and a macro eNB or BS, rapid handover between the eNBs or BSs may be implemented. For example, when an ideal-backhaul link connection is adopted between a macro eNB or BS and a pico eNB or BS, the pico eNB or BS may be considered as a "virtual distributed antenna" of the macro eNB or BS, UE accessing the pico eNB or BS may also be considered to access the macro eNB or BS, and it may also be considered that the UE may be rapidly handed over between the macro eNB or BS and pico eNB or BS which adopt the ideal-backhaul link connection.

However, under some circumstances, for example, under limits of an environmental factor or a cost factor, only a non-ideal backhaul link connection may be adopted between eNBs (or BSs), and. When UE is handed over between the eNBs (or BSs) adopting the non-ideal backhaul link connection, data transmission between the eNBs may be delayed, which disables the UE to rapidly switch between the eNBs and influences the performance of the UE. Particularly for a scenario with more small cells, the probability of handover between eNBs or BSs adopting a non-ideal backhaul link connection is higher, and the performance of UE is influenced more by incapability of rapid handover.

SUMMARY

The embodiments of the disclosure provide a method, device and a computer storage medium for wireless connection, which may implement rapid handover of UE between eNBs or BSs adopting a non-ideal backhaul link.

The technical solutions of the embodiments of the disclosure are implemented as follows.

An embodiment of the disclosure provides a method for wireless connection, which may include that:

a main TP sends a connection indication to UE, the connection indication being used to indicate the UE to establish a connection with at least one sub TP on the premise of keeping a current connection with the main TP.

An embodiment of the disclosure provides a method for wireless connection, which may include that:

UE receives a connection indication sent by a main TP; and a connection is established with at least one sub TP according to the connection indication on the premise of keeping a connection with the main TP.

An embodiment of the disclosure provides a method for wireless connection, which may include that:

a sub TP identifies UE which accesses the sub TP according to access information of the UE, wherein the UE may include single-connection UE and/or multi-connection UE.

An embodiment of the disclosure provides a method for wireless connection, which may include that:

a centralized control node performs multi-connection control on a main TP and a sub TP.

An embodiment of the disclosure provides a TP, which may include:

a sending unit, configured to send a connection indication to UE, the connection indication being used to indicate the UE to establish a connection with at least one sub TP on the premise of keeping a current connection with the main TP.

An embodiment of the disclosure provides UE, which may include:

a receiving unit, configured to receive a connection indication sent by a main TP; and a connection unit, configured to establish a connection with at least one sub TP according to the connection indication on the premise of keeping a current connection with the main TP.

An embodiment of the disclosure provides a TP, which may include:

a storage unit, configured to store access information of UE which accesses the TP; and an identification unit, configured to identify the UE according to the access information of the UE, wherein the UE may include single-connection UE and/or multi-connection UE.

An embodiment of the disclosure provides a node, which may include a control unit, configured to perform multi-connection control on a main TP and a sub TP.

An embodiment of the disclosure provides a computer storage medium, in which a computer-executable instruction may be stored, the computer-executable instruction being configured to execute any one of the above-mentioned method for wireless connections.

From the above, the technical solutions of the embodiments of the disclosure include that: a main TP sends a connection indication to UE, the connection indication being used to indicate the UE to establish a connection with at least one sub TP on the premise of keeping a current connection with the main TP. The UE receives the connection indication sent by the main TP; and the UE establishes the connection with the at least one sub TP according to the connection indication on the premise of keeping the current connection with the main TP. Therefore, the UE simultaneously accesses multiple TPs adopting non-ideal backhaul links, and then the UE can be rapidly switched between eNBs or BSs adopting the non-ideal backhaul links according to the disclosure. In addition, network communication performance may also be improved in the embodiment of the disclosure.

DETAILED DESCRIPTION

Figure 1:
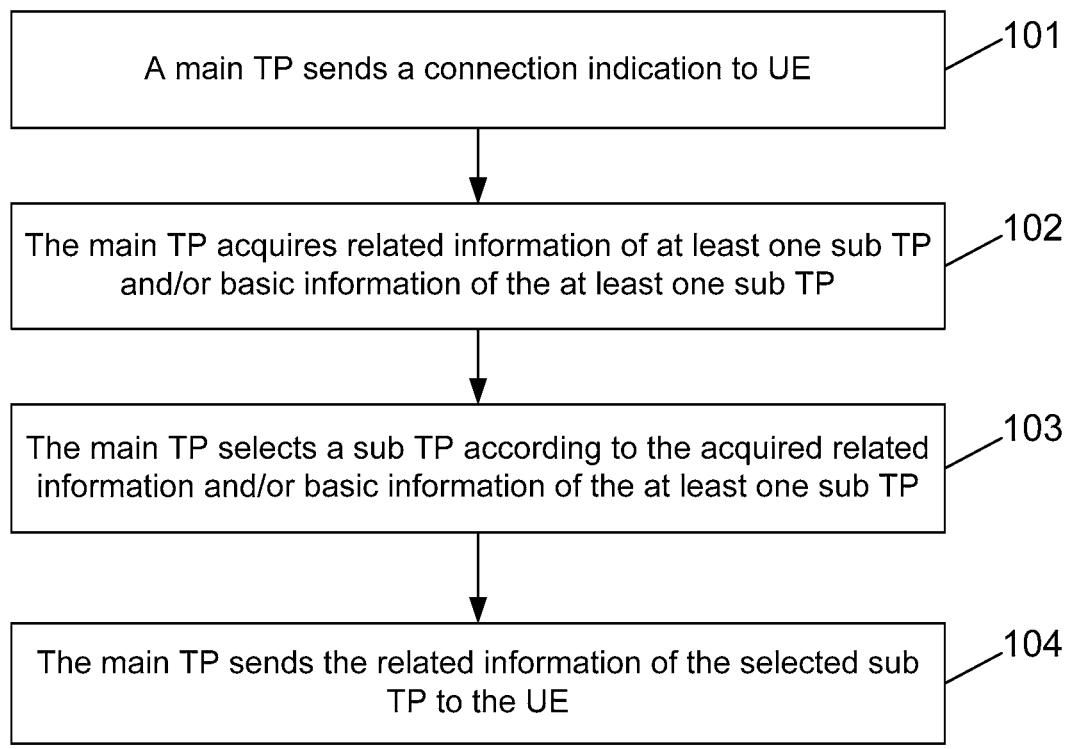
FIG. 1 is a first implementation flowchart of a method for wireless connection according to an embodiment of the disclosure.

The disclosure will be further described below with reference to the drawings and specific embodiments in detail.

An embodiment of the disclosure provides a method for wireless connection, which includes that:

a main TP sends a connection indication to UE, the connection indication being used to indicate the UE to establish a connection with at least one sub TP on the premise of keeping a current connection with the main TP.

Here, the main TP includes: 1) a node corresponding to a primary serving cell; and 2) any connected TP which may be selected as the main TP;

the sub TP includes: 1) a TP in a cell service list of the main TP, 2) a TP selected from TPs to which a centralized control node belongs; and 3) a TP autonomously detected by the UE;

the TPs may be considered as eNBs or BSs, or may be considered as serving cells, and for example: a main TP corresponds to a primary serving cell, a sub TP corresponds to a secondary serving cell, and the sub TP is a TP or a serving cell capable of being independently scheduled and independently receiving a feedback from UE, and is different from a secondary serving cell in a carrier aggregation scenario; or, the main TP corresponds to a macro eNB or BS (macro cell), and the sub TP corresponds to a pico eNB or BS (small cell) and the like;

in addition, the multiple connections may be connections for specific services (service), different services correspond to different TPs, and different services correspond to different connections; or, the multiple connections may be connections which do not distinguish services.

Preferably, the method further includes that:

the main TP acquires related information of at least one sub TP, and sends related information of a selected sub TP in the acquired related information of the at least one sub TP to the UE.

Here, the related information of the selected sub TP may be contained in one piece of information for transmission to the UE together with the connection indication, or may also be independently transmitted to the UE.

Preferably, the method further includes that:

the main TP acquires basic information of the at least one sub TP through the UE, and selects a sub TP according to predefined information, the predefined information including the basic information; or, the main TP acquires the related information of the at least one sub TP, and selects a sub TP from the at least one sub TP according to predefined information, wherein the predefined information includes the related information of the at least one sub TP.

Here, the first predefined information may simultaneously include the basic information of the at least one sub TP and the related information of the at least one sub TP; and the second predefined information may simultaneously include the basic information of the at least one sub TP and the related information of the at least one sub TP.

Preferably, the step that the main TP acquires the related information of the at least one sub TP includes that:

the main TP interacts with the at least one sub TP to obtain the related information of the at least one sub TP; or, the main TP obtains the related information of the at least one sub TP through the centralized control node.

Preferably, the method further includes that: the main TP receives a sub TP disconnection request from the UE.

Preferably, the method further includes that: the main TP executes one of the following operations of:

sending a sub TP reselection indication to the UE; sending sub TP reselection assistance information to the UE; sending a main TP reselection indication to the UE; and sending a sub TP disconnection indication to the UE or sending a confirmation of the sub TP disconnection request to the UE, wherein the sub TP reselection indication is configured to indicate the UE to reselect a sub TP; the sub TP reselection assistance information is configured to assist the UE in sub TP reselection; the main TP reselection indication is configured to indicate the UE to reselect the main TP; the sub TP disconnection indication is configured to indicate the UE to be disconnected from a target sub TP; and the confirmation of the sub TP disconnection request is a confirmation which is returned by the TP after receiving the sub TP disconnection request.

Here, reselection may also be considered as handover, i.e. handover from one TP to another TP, or handover from one serving cell to another serving cell.

FIG. 1 is an implementation flowchart of a method for wireless connection according to an embodiment of the disclosure, and as shown in FIG. 1, the method includes the following steps.

Step 101: a main TP sends a connection indication to UE, the connection indication being configured to indicate the UE to establish a connection with a sub TP selected by the main TP on the premise of keeping a current connection with the main TP.

Here, one sub TP may be selected, or multiple sub TPs may also be selected.

In a practical application, when multiple sub TPs are selected, the UE may also select one sub TP from the selected sub TPs for connection.

Step 102: the main TP acquires related information of at least one sub TP and/or basic information of the at least one sub TP.

Preferably, the step that the main TP acquires the related information of the at least one sub TP includes that:

the main TP interacts with the at least one sub TP to obtain the related information of the at least one sub TP respectively; or, the main TP obtains the related information of the at least one sub TP through a centralized control node.

Preferably, the step that the main TP acquires the basic information of the at least one sub TP includes that: the main TP acquires the basic information of the at least one sub TP through the UE.

Here, the centralized control node is a control node at a higher level compared with the main TP and the sub TP or a Mobility Management Entity (MME); and when the main TP acquires the basic information of the at least one sub TP through the UE, the main TP may perform sub TP selection according to the basic information obtained by downlink measurement of the UE, thereby ensuring downlink transmission from the at least one sub TP to the UE.

Here, when the main TP interacts with the at least one sub TP to obtain the related information of the at least one sub TP respectively, or when the main TP obtains the related information of the at least one sub TP through the centralized control node, the main TP may perform sub TP selection according to measurement of an uplink signal of the UE, where the measurement is performed by the at least one sub TP, and estimate a downlink channel by virtue of an uplink channel, or, the main TP may directly select a sub TP according to a path loss value. In this way, the UE is not required to measure a sub TP measurement or send a feedback, thereby reducing the complexity of the UE, and guaranteeing uplink transmission from the UE to the at least one sub TP.

Here, information exchanged between the main TP and the at least one sub TP includes at least one of: system configuration information of the at least one sub TP; uplink timing offset measured by the at least one sub TP according to the uplink signal of the UE; and uplink path loss, uplink power values, frequency information, cell Identifiers (IDs) and user-specific configuration information measured by the at least one sub TP according to the uplink signal of the UE.

Here, the information obtained by interaction between the main TP and the at least one sub TP or the related information obtained by the main TP through the centralized control node specifically includes at least one of: frequency information; cell IDs; a system message; user-specific configuration information; uplink timing regulation; the number of connected UE; and whether multiple connections are adopted or not. Therefore, the UE may directly perform blind detection on downlink control information and perform data interaction with the at least one sub TP after downlink synchronization is implemented between the UE and the at least one sub TP. The UE thus may rapidly establish a connection with another TP for data interaction according to the related information, thereby accelerating a system message acquisition process and an uplink synchronization process of the new TP.

Here, the UE may autonomously select a sub TP and accesses the selected sub TP at a frequency point according to frequency information. The UE accesses a new sub TP. In such a manner, a multi-connection establishment flow may be simplified, and the times of interaction between the main TP and the at least one sub TP may be reduced. In a practical application, the UE may also select a sub TP corresponding to a cell ID and accesses the selected sub TP at the frequency point according to the frequency information and the cell ID. In such a manner, complexity caused by autonomous selection of the UE over the at least one sub TP may be reduced, and centralized management is facilitated.

Here, the system message includes at least one of: Physical Random Access Channel (PRACH) configuration information of the TP; a downlink system bandwidth; an uplink frequency point; an uplink system bandwidth; a duplex system; information about proportion between uplink and downlink; Multicast Broadcast Single Frequency Network (MBSFN) subframe configuration information; information about a sending indication of other system information block(s); information about subframe configuration for uplink Sounding Reference Signal (SRS) transmission; and Physical Hybrid Automatic Repeat Request Indicator Channel (PHICH) configuration information.

Here, the user-specific configuration information includes at least one of: Physical configuration information about resource starting position of Uplink Control Channel (PUCCH); uplink power control parameter information; and Enhanced Downlink Control Channel (ePDCCH) related configuration information.

Step 103: the main TP selects a sub TP according to the acquired related information and/or basic information of the at least one sub TP.

Step 104: the main TP sends the related information of the selected sub TP to the UE.

Preferably, the method further includes that:

the main TP sends a sub TP reselection indication or a main TP reselection indication to the UE, wherein the sub TP reselection indication is configured to indicate the UE to reselect a sub TP; and the main TP reselection indication is configured to indicate the UE to reselect the main TP.

Here, reselection may also be considered as handover, i.e. handover from one TP to another TP, or handover from one serving cell to another serving cell.

Figure 2:
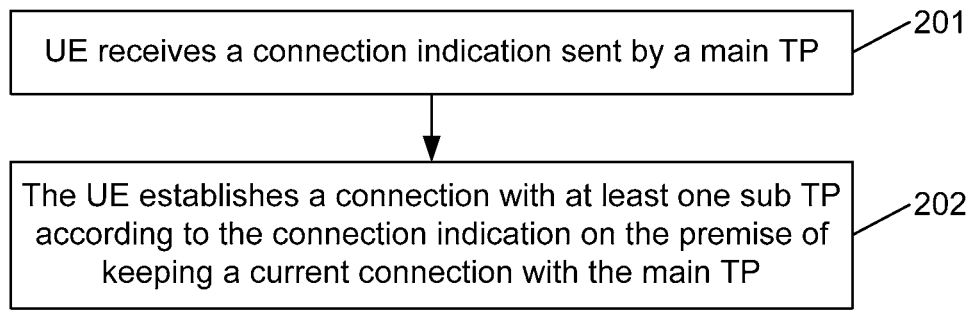
FIG. 2 is a second implementation flowchart of a method for wireless connection according to an embodiment of the disclosure.

An embodiment of the disclosure further provides a method for wireless connection, and as shown in FIG. 2, the method includes the following steps:

Step 201: UE receives a connection indication sent by a main TP; and

Step 202: the UE establishes a connection with at least one sub TP according to the connection indication on the premise of keeping a current connection with the main TP.

Here, the sub TP establishing the connection with the UE may reallocate a user-specific physical layer ID, i.e. a Cell Radio Network Temporary Identifier (C-RNTI), to the UE; or, the UE may report a C-RNTI of the UE in the main TP in a process of uplink synchronization with the sub TP; or, the UE may report its pre-allocated C-RNTI in the sub TP in the process of uplink synchronization with the sub TP.

A TP of a higher level manages UE which simultaneously accesses the main TP and the sub TP; or, the sub TP confirms a multi-connection identity of the UE according to a Media Access Control (MAC) address of the UE; or, the sub TP confirms the multi-connection identity of the UE according to a proprietary resource (a cell ID corresponding to the main TP, a unique identification code of the UE, identification information allocated by a centralized control node, or multi-connection identification signalling) of the UE.

Preferably, the method further includes that:

the UE receives, from the main TP, related information of a sub TP, and establishes a connection with the sub TP according to the related information of the sub TP.

Preferably, the method further includes that: the UE measures the sub TP to acquire basic information of the sub TP, and reports the basic information to the main TP.

Here, one or more, for example, 3 or 6, sub TPs may be reported.

The basic information, measured by the UE, of the sub TP may include: the cell ID, and Reference Signal Receiving Power (RSRP) corresponding to the TP.

For example, the UE may detect at least one of the following signals: each synchronization channel corresponding to each sub TP, each Cell-specific Reference Signal (CRS) corresponding to each sub TP, and each cell Discovery Signal (DS) corresponding to each sub TP; and these signals are measured to obtain the basic information, for example: cell IDs and RSRP, corresponding to the at least one sub TP. The corresponding sub TP(s) is (are) selected and reported.

Preferably, the sub TP connected with the UE or the sub TP measured by the UE includes at least one of:

a sub TP designated by the centralized control node;

a sub TP designated by the main TP; and a sub TP autonomously selected by the UE.

Preferably, the method further includes that:

the UE receives a sub TP reselection indication sent by the main TP;

sub TP reselection is performed in at least one of the following manners that:

the UE keeps the connection with the main TP, quits a connection with a current sub TP, and selects a new sub TP for connection;

the UE keeps the connection with the main TP, and directly performs sub TP handover at the current sub TP; and the UE keeps the connection with the main TP, and switches from the current sub TP to another sub TP under assistance of the main TP.

Here, sub TP reselection performed in the manner of directly performing sub TP handover at the current sub TP is similar to inter-cell handover under a single-connection condition in a related technology, which does not require assistance of the main TP or require a sub TP quitting process.

Sub TP reselection performed in the manner of implementing handover from the current sub TP to another sub TP under assistance of the main TP also does not require a process of quitting from the sub TP.

Preferably, the method further includes that:

the UE receives a main TP reselection indication sent by the main TP;

main TP reselection is performed in at least one of the following manners that:

the UE quits the connection with the current sub TP, and performs main TP handover; the UE keeps the connection with the current sub TP, and performs main TP handover; the UE keeps the connection with the current sub TP, and the sub TP assists the UE in main TP handover; and the main TP and the sub TP are simultaneously handed over to a pair of new main TP and sub TP.

In a practical application, the UE may also autonomously send the sub TP reselection indication or the main TP reselection indication to the sub TP or the main TP, and execute sub TP reselection operation after confirmation of the sub TP or the main TP.

Preferably, when the UE is disconnected from a target sub TP, at least one of the following manners may be adopted:

the UE receives a sub TP disconnection indication from the main TP, and is then disconnected from the target sub TP;

the UE receives a sub TP disconnection indication from the sub TP, and then is disconnected from the target sub TP; the UE sends a sub TP disconnection request to the main TP or the sub TP, and then is disconnected from the target sub TP after a confirmation is made by the main TP or the sub TP; and the UE sends a sub TP disconnection request to the main TP or the sub TP, and then is disconnected from the target sub TP.

Figure 3:
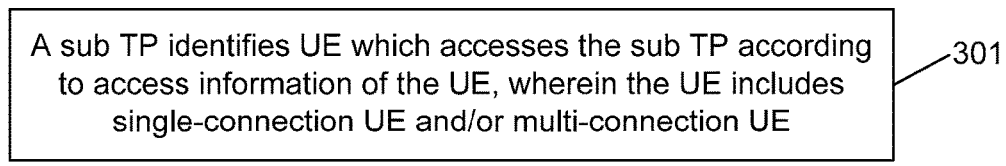
FIG. 3 is a third implementation flowchart of a method for wireless connection according to an embodiment of the disclosure.

An embodiment of the disclosure further provides a method for wireless connection, and as shown in FIG. 3, the method includes the following step:

Step 301: a sub TP identifies UE which accesses the sub TP according to access information of the UE, wherein the UE includes single-connection UE and/or multi-connection UE.

Preferably, the access information of the UE includes at least one of:

a C-RNTI of the UE used in a main TP; a cell ID corresponding to the main TP; a unique identification code (such as an International Mobile Subscriber Identity (IMSI) and an International Mobile Equipment Identity (IMEI)) of the UE, identification information allocated by a centralized control node, and a proprietary resource of the UE; multi-connection identification signalling of the UE; and a C-RNTI of the UE used in the sub TP.

Here, the proprietary resource includes a specific uplink synchronization channel resource, and the specific uplink synchronization channel resource includes: a specific time-frequency resource and/or a specific sequence.

Here, the access information may be obtained in a process during which the UE accesses the sub TP access, or may also be obtained after the UE accesses the sub TP.

Preferably, the method further includes that:

the sub TP transmits own related information to the main TP, and/or acquires the access information, transmitted by the main TP, of the multi-connection UE.

Preferably, the method further includes that:

the sub TP assists the accessing multi-connection UE in implementing main TP handover.

Preferably, the method further includes that: the sub TP executes one of the following operations:

the sub TP sends a sub TP disconnection indication to the accessing multi-connection UE, the sub TP disconnection indication being used to indicate the UE to be disconnected from a designated sub TP;

the sub TP receives a sub TP disconnection request from the multi-connection UE, and returns a confirmation; and the sub TP receives a sub TP disconnection request from the multi-connection UE.

Figure 4:
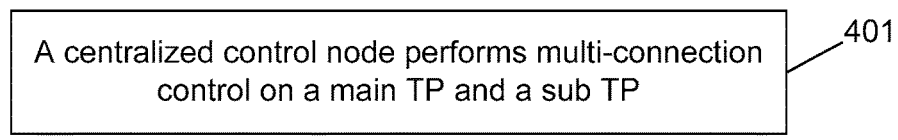
FIG. 4 is a fourth implementation flowchart of a method for wireless connection according to an embodiment of the disclosure.

An embodiment of the disclosure further provides a method for wireless connection, and as shown in FIG. 4, the method includes the following step:

Step 401: a centralized control node performs multi-connection control on a main TP and a sub TP.

Preferably, the multi-connection control is: control over at least one of:

selection of a main TP; selection of a sub TP; selection of multi-connection UE; identification of multi-connection UE accessing the sub TP; sub TP handover for the multi-connection UE; and sub TP disconnection from the multi-connection UE.

Preferably, the multi-connection control includes: control over transmission of at least one of the following information:

information about selection of a main TP; information about selection of a sub TP; related information of the sub TP; information about selection of multi-connection UE; identification information of the multi-connection UE accessing the sub TP; information about sub TP handover for the multi-connection UE; and information about sub TP disconnection from the multi-connection UE.

An embodiment of the disclosure further provides a computer storage medium, in which a computer-executable instruction is stored, the computer-executable instruction being configured to execute the method of managing wireless connection as shown in any one of FIG. 1 to FIG. 4.

Figure 5:
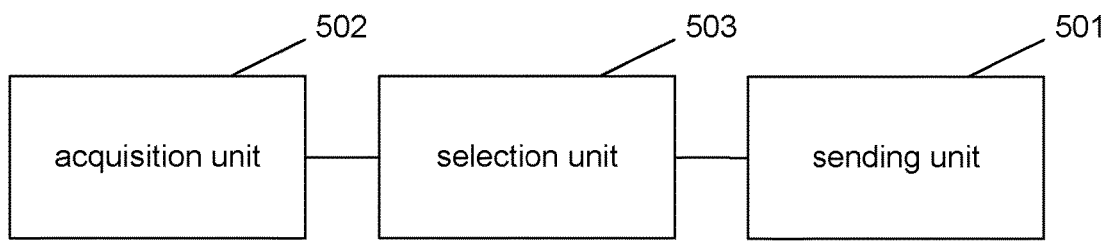
FIG. 5 is a structure diagram of a TP according to an embodiment of the disclosure.

An embodiment of the disclosure further provides a TP, and as shown in FIG. 5, the TP includes:

a sending unit 501, configured to send a connection indication to UE, the connection indication being used to indicate the UE to establish a connection with at least one sub TP on the premise of keeping a current connection with the main TP.

Here, there are one selected sub TP or a plurality of TPs.

Preferably, the TP further includes: an acquisition unit 502, configured to acquire related information of at least one sub TP; and correspondingly, the sending unit 501 is further configured to send related information of a selected sub TP in the acquired related information of the at least one sub TP to the UE.

Preferably, the TP further includes a selection unit 503, configured to acquire basic information of the at least one sub TP through the UE, and selects the sub TP according to predefined information, the predefined information including the basic information; or, select the sub TP according to predefined information, wherein the predefined information includes the related information, acquired by the acquisition unit, of the at least one sub TP.

Preferably, the acquisition unit 502 is configured to interact with the at least one sub TP to obtain the related information of the at least one sub TP; or, obtain the related information of the at least one sub TP through a centralized control node.

Preferably, the TP further includes a receiving unit 504, configured to receive a sub TP disconnection request sent by the UE.

Preferably, the sending unit 501 is further configured to execute one of the following operations of: sending a sub TP reselection indication to the UE; sending sub TP reselection assistance information to the UE; sending a main TP reselection indication to the UE; sending a sub TP disconnection indication to the UE; and sending a confirmation of the sub TP disconnection request to the UE, wherein the sub TP reselection indication is configured to indicate the UE to reselect a sub TP; the sub TP reselection assistance information is configured to assist the UE in reselecting a sub TP; the main TP reselection indication is configured to indicate the UE to reselect the main TP; the sub TP disconnection indication is configured to indicate the UE to be disconnected from a target sub TP; and the confirmation of the sub TP disconnection request is a confirmation which is returned by the TP after receiving the sub TP disconnection request.

In a practical application, each unit in the TP may be implemented by a Central Processing Unit (CPU), a Digital Signal Processor (DSP) or a Field-Programmable Gate Array (FPGA) in the TP.

Figure 6:
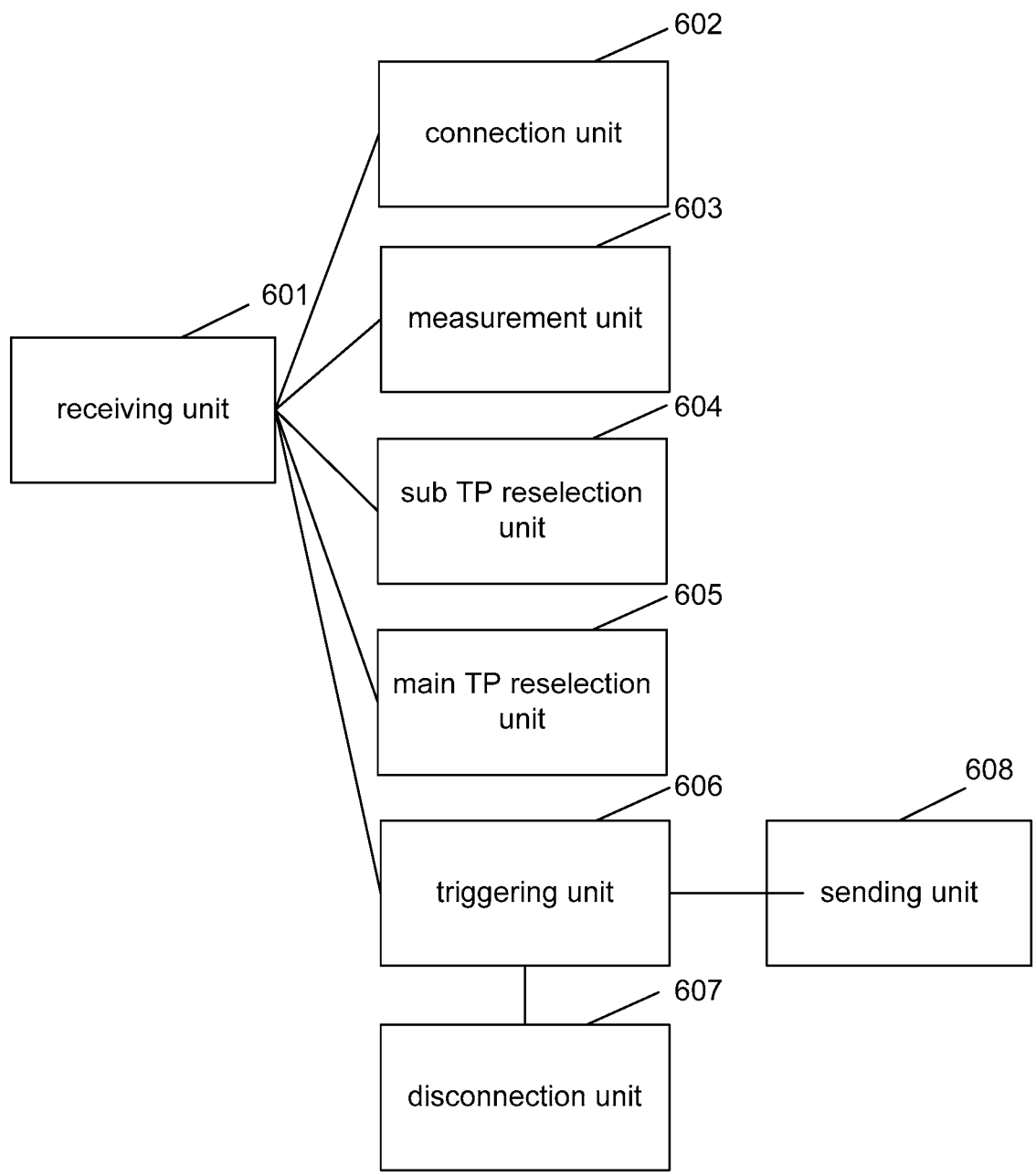
FIG. 6 is a structure diagram of UE according to an embodiment of the disclosure.

An embodiment of the disclosure provides UE, and as shown in FIG. 6, the UE includes:

a receiving unit 601, configured to receive a connection indication sent by a main TP; and a connection unit 602, configured to establish a connection with at least one sub TP according to the connection indication on the premise of keeping a current connection with the main TP.

Preferably, the receiving unit 601 is further configured to receive, from the main TP, related information of the at least one sub TP; and the connection unit 602 is configured to establish the connection with the at least one sub TP according to the related information of the at least one sub TP.

Preferably, the UE further includes: a measurement unit 603, configured to measure the at least one sub TP to acquire basic information of the at least one sub TP, and report the basic information to the main TP.

Here, one or more, for example, 3 or 6, sub TPs may be reported.

The related information may include: a cell ID, and a RSRP value corresponding to the TP.

Preferably, the sub TP connected with the UE or the sub TP measured by the UE includes at least one of:

a sub TP designated by a centralized control node;
a sub TP designated by the main TP; and
a sub TP autonomously selected by the UE.

Preferably, the receiving unit 601 is further configured to receive a sub TP reselection indication from the main TP;

the UE further includes a sub TP reselection unit 604, configured to perform sub TP reselection in at least one of the following manners of:

keeping the connection with the main TP, quitting a connection with a current sub TP, and selecting a new sub TP for connection;

keeping the connection with the main TP, and directly performing handover from the current sub TP to another sub TP; and keeping the connection with the main TP, and implementing handover from the current sub TP to another sub TP under assistance of the main TP.

Preferably, the receiving unit 601 is further configured to receive a main TP reselection indication sent by the main TP;

the UE further includes a main TP reselection unit 605, configured to perform main TP reselection in at least one of the following manners of:

quitting the connection with the current sub TP, and reselecting a main TP; keeping the connection with the current sub TP, and reselecting a main TP; keeping the connection with the current sub TP, and reselecting a main TP under assistance of the sub TP; and simultaneously switching from the main TP and the sub TP to a pair of new main TP and sub TP.

Preferably, the UE further includes a triggering unit 606, a disconnection unit 607 and a sending unit 608, wherein the triggering unit 606 is configured to trigger the receiving unit

601 to receive sub TP disconnection indication information sent by from the main TP and receive sub TP disconnection indication information from the sub TP, and trigger the disconnection unit 607 to disconnect from a target sub TP according to the indication information received by the receiving unit;

the triggering unit 606 is further configured to trigger the sending unit 608 to send a sub TP disconnection request to the main TP or the sub TP, and trigger the disconnection unit 607 to disconnect the target sub TP after the receiving unit 601 receives a confirmation from the main TP or the sub TP; and the triggering unit 606 is further configured to trigger the sending unit 608 to send the sub TP disconnection request to the main TP or the sub TP, and trigger the disconnection unit 607 to directly disconnect the target sub TP.

In a practical application, each unit in the UE may be implemented by a CPU, a DSP or a FPGA in the UE.

Figure 7:
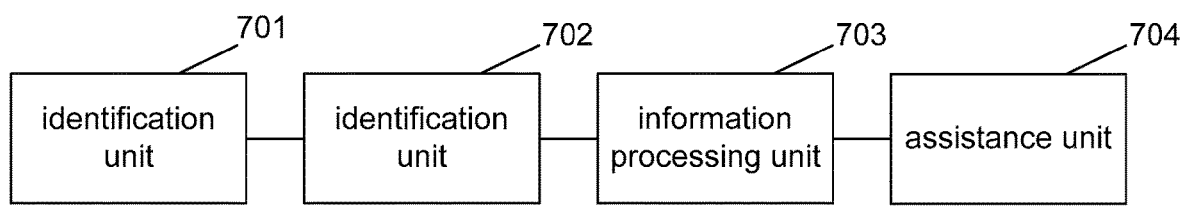
FIG. 7 is a structure diagram of a TP according to an embodiment of the disclosure.

An embodiment of the disclosure further provides a TP, and as shown in FIG. 7, the TP includes:

a storage unit 701, configured to store access information of UE; and an identification unit 702, configured to identify the UE according to the access information of the UE, wherein the UE includes single-connection UE and/or multi-connection UE.

Preferably, the access information of the UE includes at least one of:

a C-RNTI of the UE used in a main TP; an ID of a cell corresponding to the main TP; a unique identification code (such as an IMSI and an IMED of the UE; identification information allocated by a centralized control node; a proprietary resource of the UE; multi-connection identification signalling of the UE; and a C-RNTI of the UE used in the sub TP.

Here, the proprietary resource includes a specific uplink synchronization channel resource, and the specific uplink synchronization channel resource includes: a specific time-frequency resource and/or a specific sequence.

Here, the access information may be obtained in process during which the UE accesses the sub TP, or may also be obtained after the UE accesses the sub TP.

Preferably, the TP further includes: an information processing unit 703, configured to transmit own related information to the main TP, and/or acquire the access information of the multi-connection UE from the main TP.

Preferably, the TP further includes: an assistance unit 704, configured to assist the multi-connection UE in implementing main TP handover.

Preferably, the information processing unit 703 is further configured to execute one of the following operations of: sending sub TP disconnection indication information to the accessing multi-connection UE, the sub TP disconnection indication information being configured to indicate the UE to be disconnected from a designated sub TP; receiving a sub TP disconnection request of the multi-connection UE, and returning a confirmation; and receiving the sub TP disconnection request of the multi-connection UE.

In a practical application, each unit in the TP may be implemented by a CPU, a DSP or a FPGA in the TP.

An embodiment of the disclosure further provides a node, which includes a control unit 801, configured to perform multi-connection control on a main TP and a sub TP.

Preferably, the control unit 801 is further configured to control at least one of:

main TP selection; sub TP selection; multi-connection UE selection; identification of multi-connection UE accessing the sub TP; sub TP handover for the multi-connection UE; and sub TP disconnection from the multi-connection UE.

Preferably, the control unit 801 is further configured to control transmission of at least one of the following information:

information about main TP selection; information about sub TP selection; related information of the sub TP; information about multi-connection UE selection; identification information of the multi-connection UE accessing the sub TP; information about sub TP handover for the multi-connection UE; and information about sub TP disconnection from the multi-connection UE.

In a practical application, the control unit 801 in the node may be implemented by a CPU, a DSP or a FPGA in the node.

The main TP includes: 1) a node corresponding to a primary serving cell; and 2) any connected TP which may be selected as the main TP;

the sub TP includes: 1) a TP in a cell service list of the main TP, 2) a TP selected from TPs of a centralized control node, and 3) a TP autonomously detected by the UE;

the TPs may be considered as eNBs or BSs, or may be considered as serving cells, and for example: a main TP corresponds to a primary serving cell, a sub TP corresponds to a secondary serving cell, and the sub TP is a TP or a serving cell capable of being independently scheduled and independently receiving a feedback from the UE, and is different from a secondary serving cell in a carrier aggregation scenario; or, the main TP corresponds to a macro eNB or BS (macro cell), and the sub TP corresponds to a pico eNB or BS (small cell) and the like;

in addition, multiple connections may also be connections for specific services (service), different services correspond to different TPs, and different services correspond to different connections; or, multiple connections may also be connections which do not distinguish services.

From the above, the UE simultaneously accesses multiple TPs adopting non-ideal backhaul links, and then rapid handover of the UE among eNBs(BSs) adopting the non-ideal backhaul links may be implemented according to the disclosure.

The disclosure will be described below with reference to specific embodiments.

Specific Embodiment 1

A main TP sends indication information to indicate UE to establish another connection on the premise of keeping a current connection.

In the embodiment, the UE feeds back basic information of at least one sub TP, and the main TP selects a sub TP.

The UE performs measurement after obtaining the indication information, and reports the information of the sub TP with which a connection is to be established. Or, the UE starts measuring the at least one sub TP according to configuration information of the main TP, and reports a measurement result to the main TP, and the main TP sends the indication information to the UE after selecting the sub TP, wherein the at least one sub TP measured by the UE may be designated by a centralized control node, or designated by the main TP, or autonomously selected by the UE.

The reported information of the TP includes: a cell ID, an RSRP value corresponding to the TP, a Reference Signal Received Quality (RSRQ) value corresponding to the TP, and the like.

For example, the UE may measure one of the following information corresponding to each sub TP: a synchronization channel, a CRS and a DS; the UE may obtain the cell ID(s) and RSRP value(s) corresponding to the at least one sub TP according to the measurement result(s), and select and report the best sub TP.

One or multiple TPs may be reported, for example: 3 or 6.

The main TP receives the basic information, reported by the UE, of the at least one sub TP, and the main TP selects a sub TP and sends the information of the sub TP to the UE.

The main TP may select the sub TP from the at least one sub TP reported by the UE or may also select another better sub TP by integrating various conditions, for example: the number of UE that accesses each sub TP and a distribution condition of each sub TP.

The embodiment has beneficial effects that the main TP may select a sub TP according to downlink measurement of the UE, thereby ensuring downlink transmission from the sub TP to the UE and also improving selectivity of the UE.

Specific Embodiment 2

A main TP sends indication information to indicate UE to establish another connection on the premise of keeping a current connection.

In the embodiment, the main TP selects a sub TP, and the UE is not required to feed back information of the sub TP before establishing a connection with the sub TP.

The main TP interacts with the sub TP first to obtain related information of the sub TP; or, the main TP may also obtain the related information of the sub TP through a centralized control node.

Here, information exchanged during the interaction includes at least one of: system configuration information of the sub TP; uplink timing offset measured by the sub TP according to an uplink signal of the UE; an uplink path loss or uplink power value measured by the sub TP according to the uplink signal of the UE; frequency information; a cell ID; user-specific configuration information; the number of connected UE; and whether access of multi-connection UE is allowed or not.

The TP may also send, besides the indication information, the following information: related information of a TP corresponding to another connection, wherein the related information may include at least one of: frequency information; a cell ID; a system message; user-specific configuration information; and uplink timing regulation.

The another connection may correspond to one TP or multiple TPs (a set of TPs, the UE autonomously select a specific TP for access), for example: 3 or 6.

The system message includes at least one of: PRACH configuration information of the TP; a downlink system bandwidth; an uplink frequency point; an uplink system bandwidth; a duplex system; information about proportion between uplink and downlink; information about MBSFN subframe configuration; information about a sending indication of other system information block; and information about subframe configuration for SRS transmission;

the user-specific configuration information includes at least one of: configuration information of a starting position of a PUCCH resource; uplink power control parameter information; ePDCCH related configuration information; C-RNT information of the UE used in the sub TP; and PRACH resource information of the UE used in the sub TP, the PRACH resource information including a time-frequency position and sequence information.

The embodiment has beneficial effects that the UE is not required to measure or feed back a sub TP, so that complexity of the UE is reduced; the main TP may select a sub TP according to measurement performed by the sub TP for the uplink signal of the UE, for example: estimate a downlink channel by an uplink channel, or directly select a sub TP according to a path loss value, so that uplink transmission from the UE to the sub TP can be guaranteed; or, the sub TP is directly selected according to a factor such as the distribution condition of the sub TP, the number of the UE accessing the sub TP and the like.

Specific Embodiment 3

A main TP sends indication information to indicate UE to establish another connection on the premise of keeping a current connection; and the main TP further sends, besides the indication information, information including: related information of a sub TP corresponding to another connection, the related information including frequency information, a cell ID corresponding to the sub TP, and system configuration information.

At this moment, the UE autonomously selects a sub TP for access on a frequency point according to information of the frequency point.

A process during which the UE accesses the sub TP includes that: a downlink synchronization signal is searched at the frequency point of the sub TP, the sub TP with a best signal is selected for synchronization, the system configuration information of the sub TP is acquired, and uplink synchronization is initiated to implement uplink synchronization of the UE and the sub TP.

In an uplink synchronization process of the UE and the sub TP, the sub TP may reallocate a C-RNTI to the UE.

A TP of a higher level (such as: a centralized control node and an MME) manages UE which simultaneously accesses the main TP and the sub TP, or, the sub TP confirms a multi-connection identity of the UE according to obtained information of multi-connection UE and a unique ID of the UE.

The embodiment has the beneficial effects that a multi-connection establishment flow is simplified, and interaction between the main TP and the sub TP is reduced.

Specific Embodiment 4

A main TP sends indication information to indicate UE to establish another connection on the premise of keeping a current connection; and the main TP further sends, besides the indication information, information including: related information of a sub TP corresponding to another connection, the related information includes information of a frequency point and information of a cell ID, and the UE selects the sub TP corresponding to the cell ID at the frequency point for access according to the information of the frequency point and the information of the cell ID.

An access process of the UE to the sub TP includes that: a downlink synchronization signal corresponding to the sub TP is searched at a frequency point of the sub TP (a cell ID corresponds to a specific sub TP and a cell ID corresponds to a specific downlink synchronization channel) for synchronization, system configuration information of the sub TP is acquired, and uplink synchronization is initiated to implement uplink synchronization of the UE and the sub TP.

The UE may report a C-RNTI of the UE used in the main TP in a process that the UE performs uplink synchronization with the sub TP, and still uses a user-specific physical layer ID of the main TP in the sub TP; or, in the process of uplink synchronization of the UE and the sub TP, the sub TP may reallocate a C-RNTI to the UE, and the UE may not report its C-RNTI used in the main TP when the UE performs uplink synchronization with the sub TP.

A TP of a higher level (such as: a centralized control node and an MME) manages UE which simultaneously accesses the main TP and the sub TP, or, the sub TP confirms a multi-connection identity of the UE according to obtained information of multi-connection UE and a unique ID of the multi-connection UE, or, the sub TP confirms its multi-connection identity according to the user-specific physical layer ID reported by the UE and used in the main TP.

The embodiment has the beneficial effects that complexity caused by autonomous selection of the UE over the sub TP is reduced, and centralized management is facilitated.

Specific Embodiment 5

A main TP sends indication information to indicate UE to establish another connection on the premise of keeping a current connection; and the main TP further sends, besides the indication information, information including: related information of a sub TP corresponding to another connection, the related information including at least one of: information of a frequency point and information of a cell ID; system configuration information; user-specific configuration information; and uplink timing information, wherein the user-specific configuration information includes at least one of: configuration information of a PUCCH resource which bears uplink control information corresponding to a sub TP; power control information of an uplink control channel and/or an uplink data channel; sequence configuration information of an uplink reference signal; sequence configuration information of a downlink reference signal; configuration information of an ePDCCH; and information about a C-RNTI allocated to the UE by the sub TP.

The UE may directly perform blind detection on downlink control information sent by the sub TP after downlink synchronization with the sub TP, and perform uplink and downlink data interaction with the sub TP according to the downlink control information; or, the UE may perform uplink synchronization according to uplink synchronization channel resource information in the user-specific configuration information after the UE realizes downlink synchronization with the sub TP, and in a process of uplink synchronization of the UE and the sub TP, the sub TP may reallocate a C-RNTI to the UE, and the sub TP identifies the UE to confirm its multi-connection UE identity according to an uplink synchronization channel resource;

or, the UE may perform uplink synchronization after downlink synchronization with the sub TP, and report information about the C-RNTI allocated by the sub TP in the process of uplink synchronization of the UE and the sub TP, and the sub TP confirms that the UE is multi-connection UE according to the reported C-RNTI information; or, the UE may perform uplink synchronization after realizing downlink synchronization with the sub TP, and report a cell ID corresponding to the main TP (a unique identification code of the UE, identification information allocated by the centralized control node and multi-connection identification signalling) in the process of uplink synchronization of the UE and the sub TP, and the sub TP confirms that the UE is multi-connection UE according to the information reported by the UE.

In the embodiment, the UE may rapidly establish the connection with another sub TP for data interaction according to related information, so that a system message acquisition process and an uplink synchronization process for the new TP are reduced, or, the sub TP may identify the multi-connection UE more easily.

Specific Embodiment 6

A process of quitting multi-connection includes at least one of following operations:

a main TP indicates UE to be disconnected from a sub TP, for example: the main TP sends an indication to the UE, the indication being used to indicate the UE to be disconnected from the sub TP, and when there are multiple sub TPs connected with the UE, the indication further includes IDs of the disconnected sub TPs;

the UE may feed back whether the indication is successfully received or not to the main TP after receiving the indication, and does not receive data of the sub TP any longer after a defined time interval, and then is disconnected from the sub TP; and the UE does not send a feedback to the main TP after receiving the indication, and does not receive the data of the sub TP any longer after the defined time interval, and then is disconnected from the sub TP.

The sub TP indicates the UE to be disconnected from the sub TP, for example: the sub TP sends an indication to the UE, the indication being used to indicate the UE to be disconnected from the sub TP; the UE may feed back whether the indication is successfully received or not to the sub TP after receiving the indication, and does not receive data of the sub TP any longer after a defined time interval, and then is disconnected from the sub T; and the UE may also not send a feedback to the sub TP after receiving the indication, does not receive the data of the sub TP directly after the defined time interval, and is disconnected from the sub TP.

The UE autonomously sends a disconnection request to the sub TP or the main TP, and is disconnected from the sub TP after confirmation of the TP.

Specific Embodiment 7

A sub TP reselection process in a multi-connection state includes at least one of the following operation that:

a connection with a sub TP is released, and then a connection with a new sub TP is established;

a connection with a main TP is kept, and sub TP handover is directly performed on the current sub TP; such a manner is similar to inter-cell handover under a single-connection condition in the related technology, assistance from the main TP is not required, and a process of quitting from a sub TP is not required; and a connection with the main TP is kept, handover from the current sub TP to another sub TP is implemented under assistance of the main TP, and such a manner does not require a process of quitting from the sub TP.

Specific Embodiment 8

A main TP reselection (cell handover) process in a multi-connection state includes at least one of the following operation that:

connections with all sub TPs are released, and then single-point handover is performed;

a main TP is independently handed over, and connections with sub TPs are kept;

the connections of the sub TPs are kept, and the sub TPs assist the UE in implementing handover of the main TP; and a main TP and a sub TP are simultaneously handed over to a pair of new main TP and sub TP.

Specific Embodiment 9

A centralized control node controls a main TP and a sub TP.

The control includes at least one of: main TP selection; sub TP selection; multi-connection UE selection; identification of multi-connection UE accessing a sub TP; sub TP handover for the multi-connection UE; and sub TP disconnection from the multi-connection UE.

The control further includes transmission of at least one of the following information:

information about main TP selection; information about sub TP selection; related information of the sub TP; information about multi-connection UE selection; identification information of the multi-connection UE accessing the sub TP; information about sub TP handover for the multi-connection UE; and information about sub TP disconnection from the multi-connection UE.

The main TP and/or the sub TP establish(es) multi-connection with UE according to information transmitted by the centralized control node.

According to the embodiment, the technical solution provided by the embodiment of the disclosure implements connections between the UE and multiple TPs, and solves the problem that handover among the TPs (eNBs or BSs, terminals, cells and TPs) adopting non-ideal backhaul links cannot be performed rapidly. In addition, the disclosure may also improve network communication performance.

In the embodiments provided by the disclosure, it should be understood that the system, device and method may be implemented in other manners. For example, the device embodiment described above are only schematic, for example, the modules or units are divided logically. In practice, other division manners may also be adopted, for example, multiple units or components may be combined or integrated into another system, or some characteristics may be ignored, or may be not executed. From another point, coupling or direct coupling or communication connection, as displayed or discussed, may be implemented through interfaces; indirect coupling or communication connection between devices or between units may be electrical, mechanical or the like.

The units described as separate components may be or may be not physically separated, and components displayed as units may be or may be not physical units, namely, the components may be located in the same place, or may also be distributed to multiple network units. A part or all of units may be selected to implement the solutions of the embodiments according to a practical requirement.

In addition, each function unit in each embodiment of the disclosure may be integrated into one processing unit, or may also exist independently and physically, or two or more than two units may also be integrated into one unit. The integrated units may be implemented by hardware, or may also be implemented by software function units.

The integrated units, when implemented in form of software function unit and sold or used as independent products, may be stored in a computer-readable storage medium. Based on such understanding, the technical solutions of the disclosure substantially or the parts making contributions to a conventional art or all or part of the technical solutions may be embodied in form of software product, and the computer software product is stored in a storage medium, including a plurality of instructions configured to enable a computer device (which may be a personal computer, server, network device or the like) or a processor to execute all or part of steps of the method of each embodiment of the disclosure. The storage medium includes: various media capable of storing program codes such as a U disk, a mobile hard disk, a Read-Only Memory (ROM), a Random Access Memory (RAM), a magnetic disk, or a compact disc.

The above are only the specific implementation modes of the disclosure and not intended to limit the scope of protection of the disclosure. Any variations or replacements apparent to those skilled in the art within the technical scope of the disclosure shall fall within the scope of protection of the disclosure. Therefore, the scope of protection of the disclosure shall be subjected to the scope of protection of the claims.

What is claimed is:

1. A method for wireless communication, comprising:
   receiving, by User Equipment (UE), a connection indication from a main Transmission Point (TP);
   measuring at least one sub TP to acquire basic information of the at least one sub TP, and reporting the basic information to the main TP;
   receiving related information of the at least one sub TP from the main TP; and
   establishing a connection with the at least one sub TP according to the related information of the at least one sub TP and the connection indication;
   wherein the related information is received by the UE together with the connection indication.

2. The method according to claim 1, wherein the at least one sub TP connected with the UE or the at least one sub TP measured by the UE comprises at least one of:
   a sub TP designated by the main TP; or
   a sub TP autonomously selected by the UE.

3. The method according to claim 1, further comprising: executing, by the UE, the following operation:
   sending a sub TP disconnection request to the main TP or the sub TP.

4. The method according to claim 1, wherein the connection indication is configured to indicate the UE to establish a connection with at least one sub TP on the premise of keeping a current connection with the main TP; and
   wherein the basic information comprises: a cell ID, and reference signal receiving power (RSRP) corresponding to the TP.

5. The method according to claim 1, wherein the related information comprises at least one of: frequency information, cell identifiers (IDs), a system message, user-specific configuration information, uplink timing regulation, a number of connected UE, or whether multiple connections are adopted or not.

6. The method according to claim 5, wherein the system message comprises at least one of:
   physical random access channel (PRACH) configuration information of the TP, a downlink system bandwidth, an uplink frequency point, an uplink system bandwidth, a duplex system, information about proportion between uplink and downlink, multicast broadcast single frequency network (MBSFN) subframe configuration information, information about a sending indication of other system information block(s), information about subframe configuration for uplink sounding reference signal (SRS) transmission, or physical hybrid automatic repeat request indicator channel (PHICH) configuration information; and wherein the user-specific configuration information comprises at least one of: physical configuration information about resource starting position of uplink control channel (PUCCH), uplink power control parameter information, or enhanced downlink control channel (ePDCCH) related configuration information.

7. The method according to claim 1, wherein the main TP comprises at least one of: a node corresponding to a primary serving cell, or any connected TP which may be selected as the main TP; and wherein the sub TP comprises at least one of: a TP in a cell service list of the main TP, a TP selected from TPs to which a centralized control node belongs, or a TP autonomously detected by the UE.

8. The method according to claim 1, wherein when the UE reports the basic information of the at least one sub TP to the main TP, a sub TP is selected according to the basic information.

9. A User Equipment (UE), for wireless connection, characterized in that the UE comprises:

a receiving unit configured to receive a connection indication sent by a main Transmission Point (TP);

a connection unit configured to establish a connection with at least one sub TP according to the connection indication on the premise of keeping a current connection with the main TP; and a measurement unit configured to measure the at least one sub TP to acquire basic information of the at least one sub TP, and report the basic information to the main TP, wherein the receiving unit is further configured to receive, from the main TP, related information of the at least one sub TP, wherein the connection unit is further configured to establish the connection with the at least one sub TP according to the related information of the at least one sub TP, and wherein the related information is received by the receiving unit together with the connection indication.

10. The UE according to claim 9, wherein the basic information includes downlink measurement of the UE.

11. The UE according to claim 9, the sub TP connected with the UE or the sub TP measured by the UE includes at least one of:

a sub TP designated by the main TP; and
a sub TP autonomously selected by the UE.

12. The UE according to claim 9, further includes:
a triggering unit; and
a sending unit,
wherein the triggering unit is configured to trigger the sending unit to send a sub TP disconnection request to the main TP or the sub TP.

* * * * *